United States Patent
Uematsu et al.

(10) Patent No.: US 6,848,612 B2
(45) Date of Patent: Feb. 1, 2005

(54) STORE SALES PROCEED DEPOSITING MACHINE INCLUDING A CASH DISPENSER

(75) Inventors: Tsutomu Uematsu, Kawasaki (JP); Takahiko Tanaka, Kawasaki (JP); Chisato Hiyama, Kawasaki (JP); Kou Ezoe, Kawasaki (JP); Kauzshi Watari, Kawasaki (JP); Katsuhiko Uchiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 09/747,967

(22) Filed: Dec. 27, 2000

(65) Prior Publication Data

US 2001/0020638 A1 Sep. 13, 2001

(30) Foreign Application Priority Data

Mar. 10, 2000 (JP) ........................................ 2000-067473

(51) Int. Cl.[7] .............................................. G06F 17/60
(52) U.S. Cl. ........................... 235/379; 235/381; 902/12
(58) Field of Search ................................ 235/379, 381, 235/375, 380, 382, 382.5; 402/8, 9, 10, 11, 12, 13, 14, 15, 17, 18, 20; 209/534; 271/3.01; 194/206; 705/43

(56) References Cited

U.S. PATENT DOCUMENTS

| | | | | |
|---|---|---|---|---|
| 4,166,945 A | * | 9/1979 | Inoyama et al. | ............ 235/379 |
| 4,365,700 A | * | 12/1982 | Arimoto et al. | ............ 194/206 |
| 4,816,652 A | * | 3/1989 | Wildgoose et al. | ......... 235/379 |
| 4,883,183 A | * | 11/1989 | Kimura et al. | ............. 209/534 |
| 4,890,824 A | * | 1/1990 | Uchida et al. | ............. 271/3.01 |
| 5,250,788 A | * | 10/1993 | Sugai et al. | ................ 235/379 |
| 5,508,500 A | * | 4/1996 | Martin et al. | ................ 235/381 |
| 6,006,989 A | * | 12/1999 | Ademmer et al. | ........... 235/379 |
| 6,206,284 B1 | * | 3/2001 | Do et al. | ..................... 235/379 |
| 6,371,368 B1 | * | 4/2002 | Owens et al. | ............... 235/379 |
| 6,422,458 B1 | * | 7/2002 | Katou et al. | ............... 235/379 |
| 6,607,124 B1 | * | 8/2003 | Junkins et al. | .............. 235/379 |
| 2002/0170956 A1 | * | 11/2002 | Katou et al. | ................ 235/379 |
| 2003/0047601 A1 | * | 3/2003 | Nomiyama et al. | ......... 235/381 |
| 2004/0028266 A1 | * | 2/2004 | Jones et al. | ................. 382/135 |

FOREIGN PATENT DOCUMENTS

| | | | |
|---|---|---|---|
| DE | 37 16781 A1 | * | 10/1988 |
| JP | 57-212568 A | * | 12/1982 |
| JP | 64-21693 A | * | 1/1989 |
| JP | 6-60246 A | * | 3/1994 |
| JP | 2000-259948 | | 9/2000 |
| JP | 2002-133094 A | * | 5/2002 |

* cited by examiner

Primary Examiner—Jared J. Fureman
(74) Attorney, Agent, or Firm—Staas & Halsey LLP

(57) ABSTRACT

A store sales proceed depositing machine having a deposit operation panel at one side of the machine, a storage unit storing deposited cash, and an external communications unit communicating with a cash logistics company and a financial institution. A cashing operation panel is provided at a side of the machine different from the deposit operation panel. Inside the machine are provided a cashing controller; a second cash storage unit storing a predetermined amount of cash for a cashing service; a second cash temporary holder removing, counting, and then temporary holding cash from the second cash storage unit, the amount having been entered at the cashing operation panel; and a cashing processor dispensing cash from the second cash temporary holder and issuing a receipt. The cashing controller verifies user identification, confirms the user's account balance, dispenses cash from the user's account, and notifies the financial institution.

2 Claims, 12 Drawing Sheets

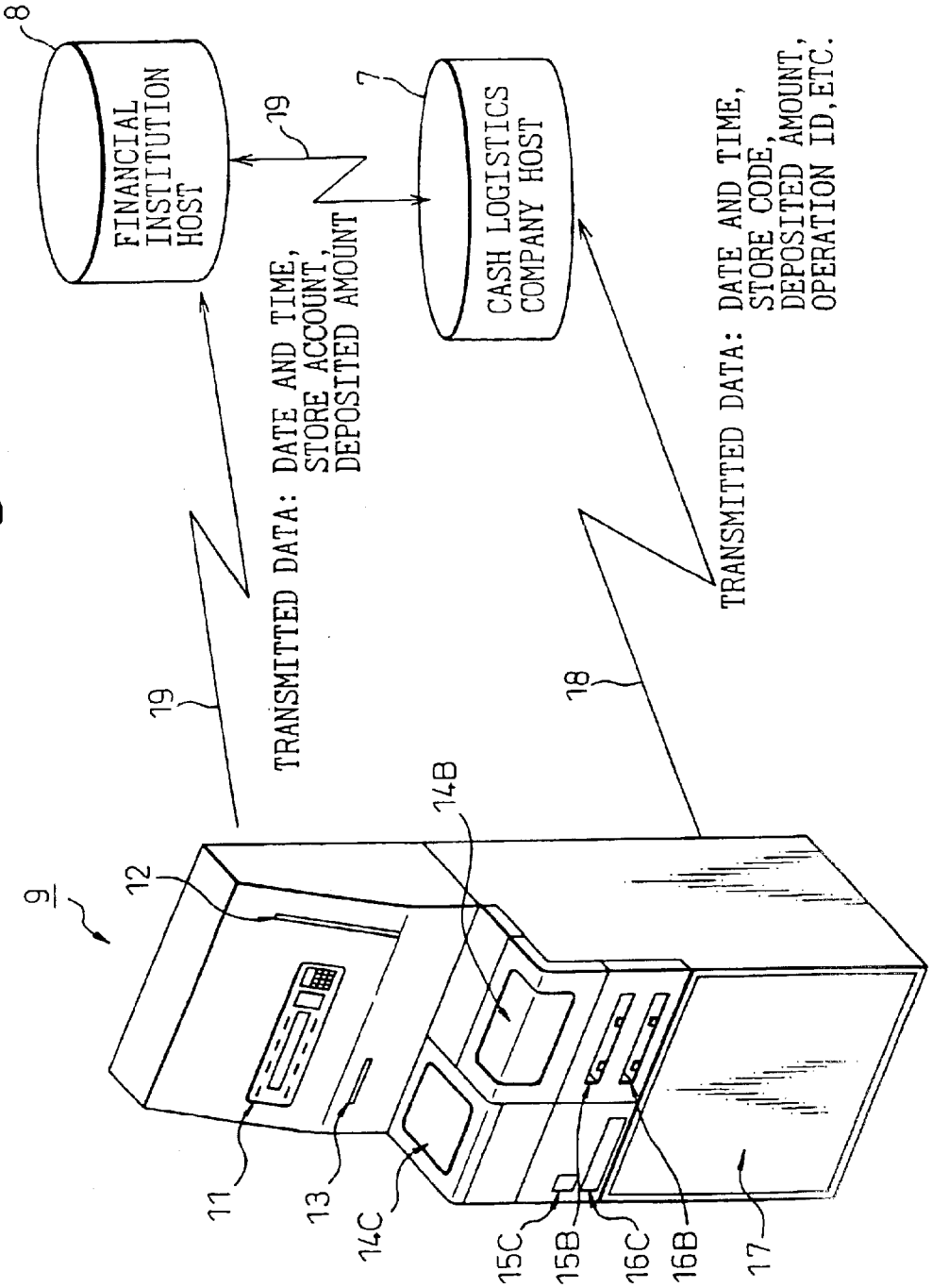

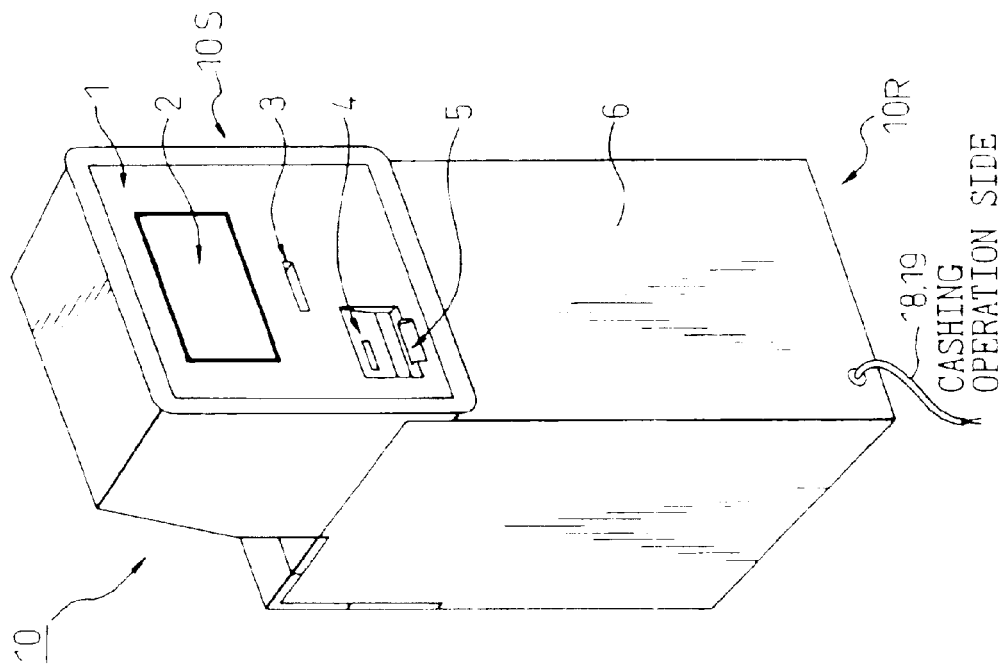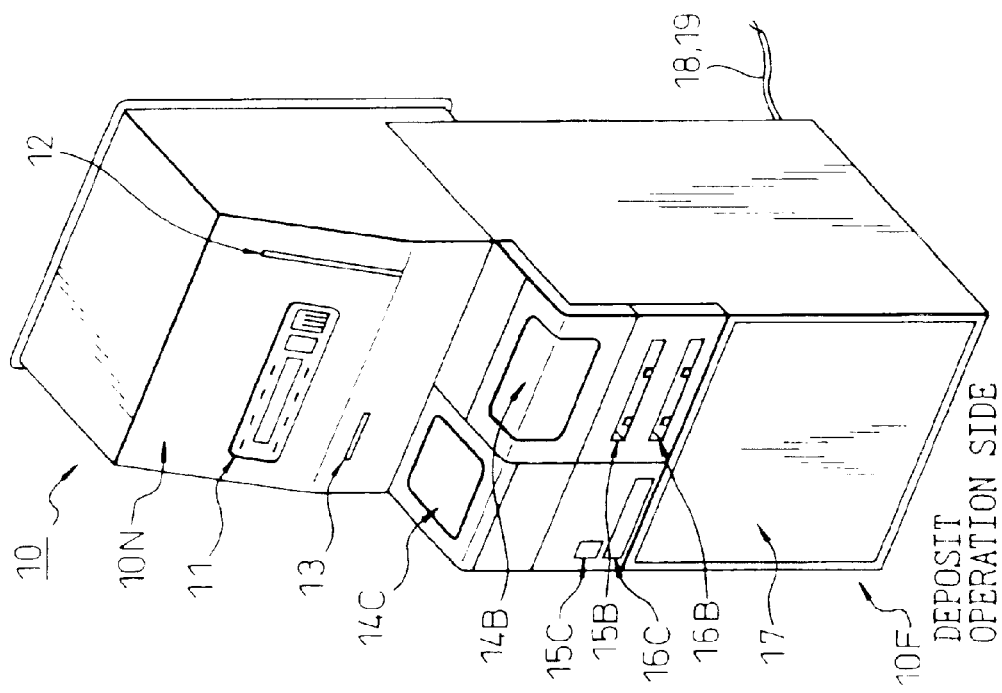

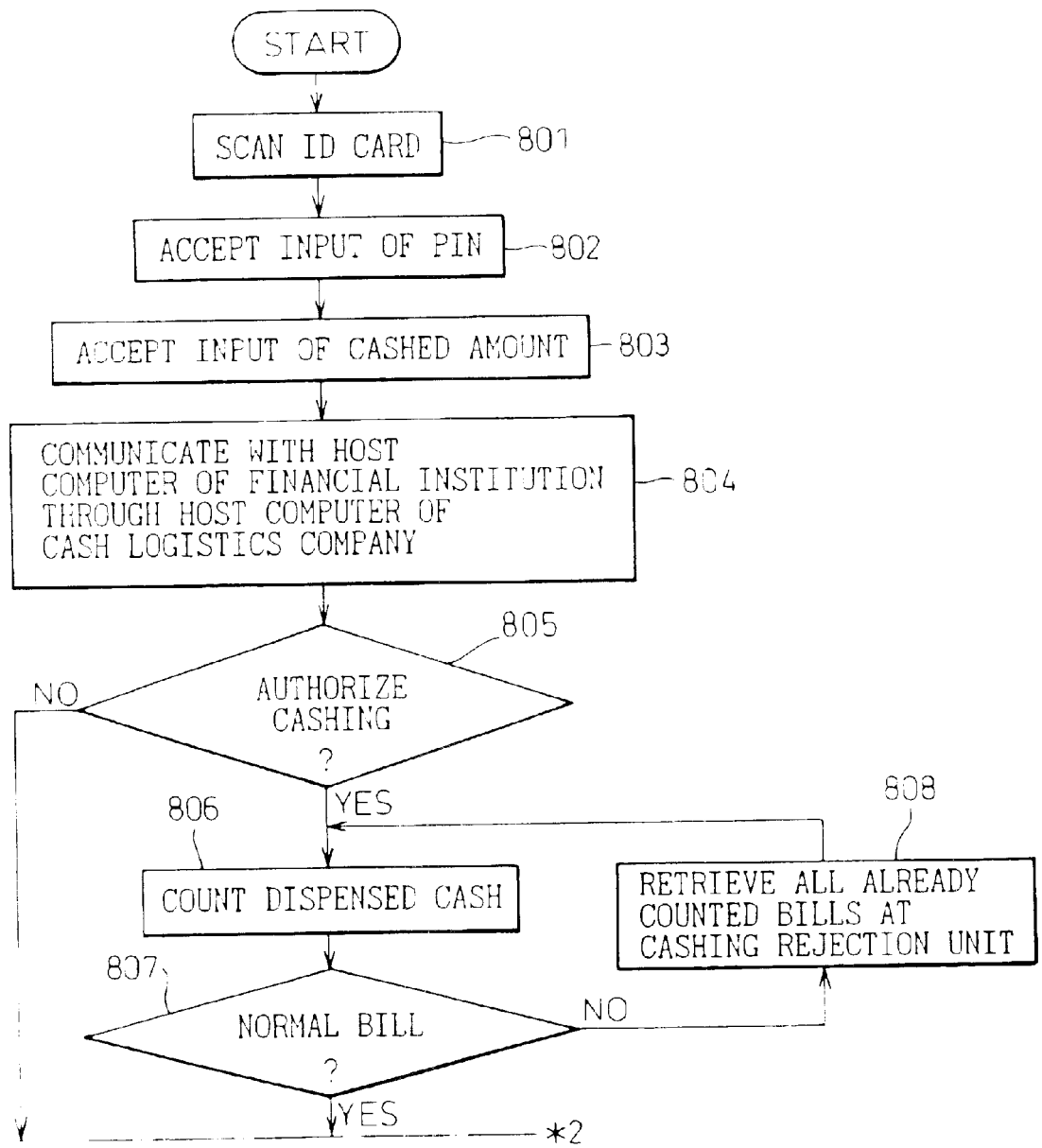

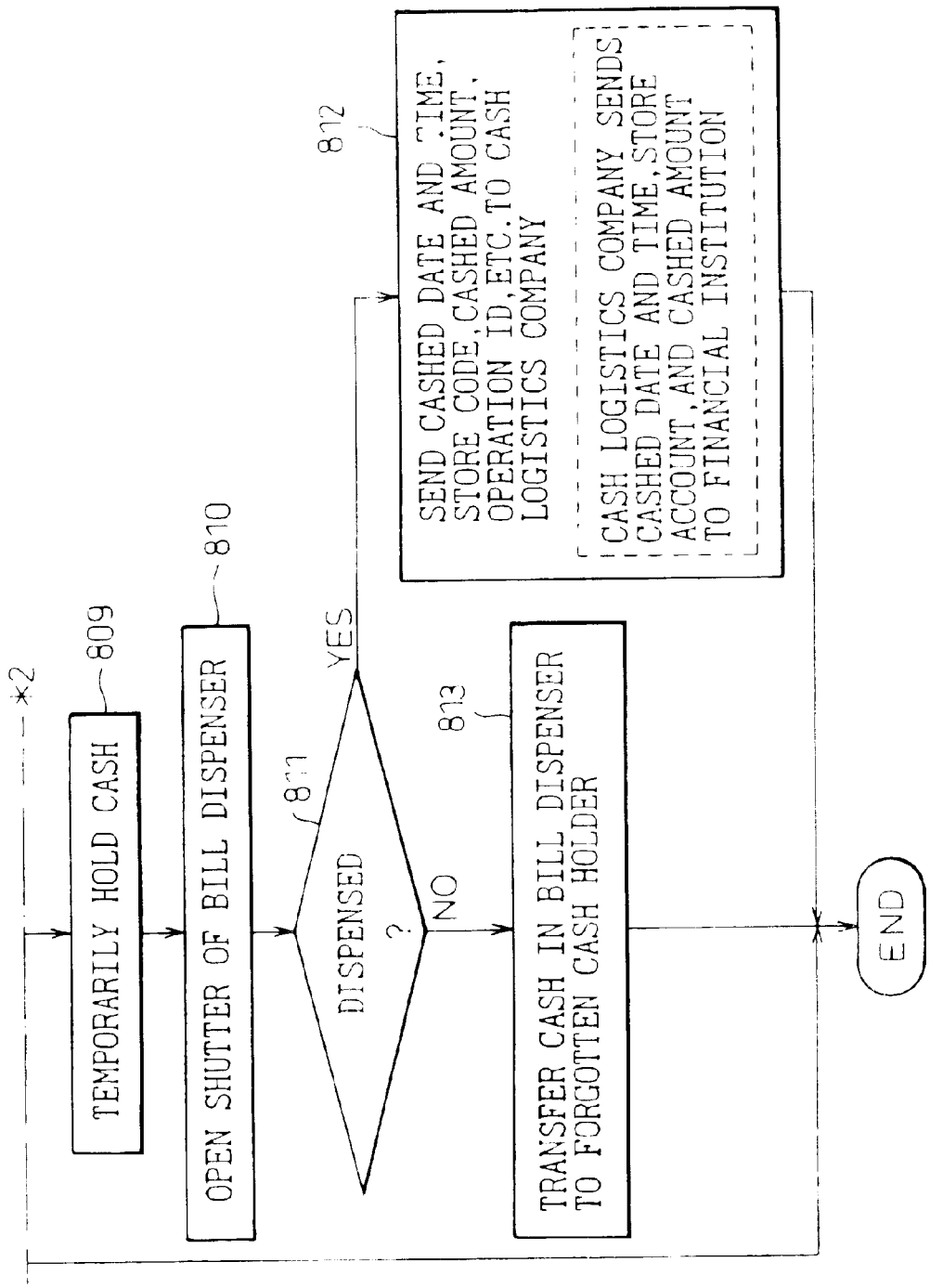

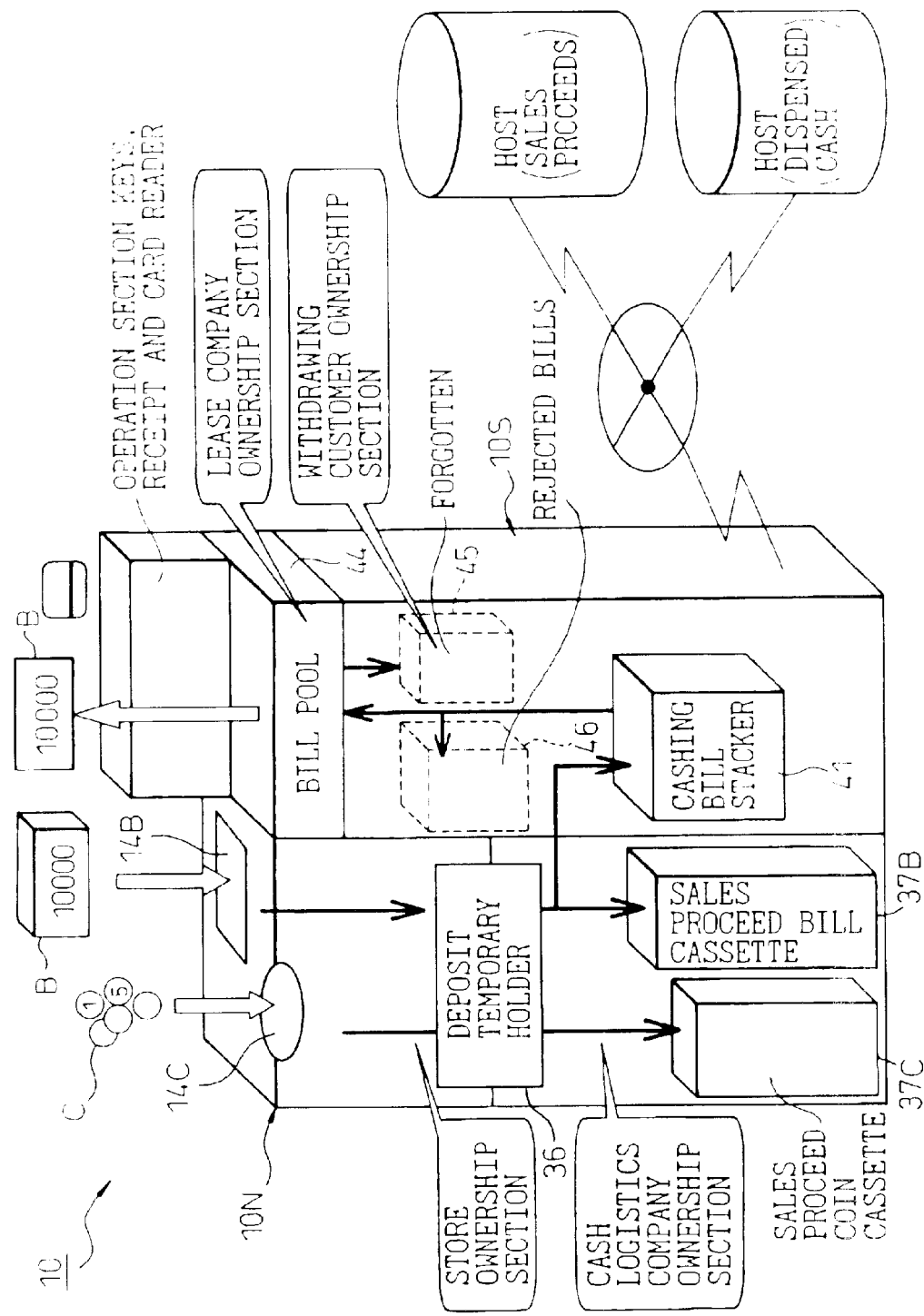

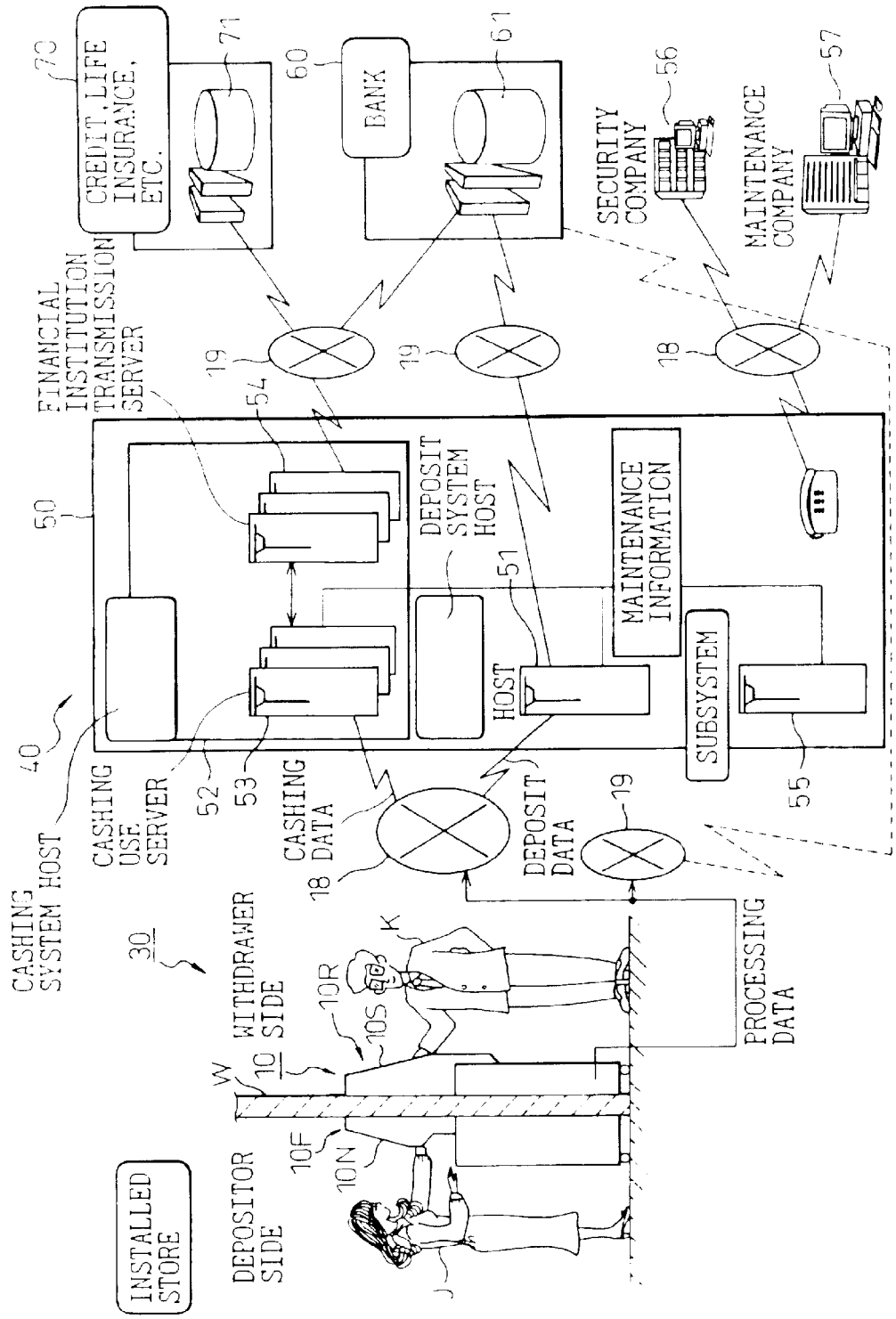

STORE SALES PROCEED DEPOSITING MACHINE INCLUDING A CASH DISPENSER

BACKGROUND OF THE INVENTION

1. Field of the Invention

The present invention relates to a store sales proceed depositing machine, more particularly relates to a store sales proceed depositing machine which is installed in a store to manage and store sales proceeds of a store.

2. Description of the Related Art

In the past, store sales proceed depositing machines have sometimes been installed in stores to allow sales proceeds to be directly deposited and managed. These store sales proceed depositing machines count the deposited store sales proceeds, store the cash in a cash storage unit, and send processing data on-line to a management center of a cash logistics company. The management center remits funds on behalf of the store to a financial institution based on the processing data of the store sales proceed depositing machine before retrieving the cash from the machine. The cash in the cash storage unit of the store sales proceed depositing machine is retrieved by the cash logistics company at a later date and compared against the processing data received by the management center. This type of service of cash logistics companies is becoming increasingly necessary along with the rise in crime.

Such a store sales proceed depositing machine, however, suffers from the problem of increasing the expenses of the store since the store is required to install such a machine and pay for the cash retrieval service. Therefore, a store sales proceed depositing machine which processes deposits of store sales proceeds at a lower cost has been desired.

SUMMARY OF THE INVENTION

An object of the present invention is to provide a store sales proceed depositing machine given the functions of a cash dispenser so as to combine a store sales proceed retrieval system and a cashing service system in the store and thereby keep down the cost of installation of a store sales proceed depositing machine and promote the spread of store sales proceed depositing machines.

To achieve the above object, the present invention provides a store sales proceed depositing machine provided with deposit operation panel at one side of the machine and provided inside the machine with a cash storage unit and an external communications unit for notifying a cash logistics company of deposit data through a public line, wherein provision is made of a cashing operation panel at a side of the machine different from the deposit side, provision is made inside of the machine of a cashing controller, a second cash storage unit for storing a predetermined amount of cash for a cashing service, a second cash temporary holder for taking out and temporarily holding a cashed amount from the second cash storage unit, and a cashing processor for dispensing cash from the second cash temporary holder and issuing a receipt, the external communications unit is given a function enabling communication with a financial institution, and the cashing controller is made to perform processing for verification of the person performing the cashing operation, processing for determining whether to authorize cashing by confirmation of the balance in that person's savings account, processing for dispensing cash to be reimbursed from that person's savings account when authorizing cashing, and processing for notifying the cashing data to the financial institution.

In this case, cash can be resupplied to the second cash storage unit by apportioning cash deposited in the store sales proceed depositing machine. Further, the amount of the deposit apportioned can be made one giving a constant balance of cash for the cashing service in the second cash storage unit. Further, in this case, by notifying the cash logistics company of the amount of apportioned cash along with the deposit data using the external communications unit, it is possible to allow the cash logistics company to match the amount of deposit of the sales proceeds with the amount of cash to be retrieved by the cash logistics company. Still further, it is possible to use the originally equipped cash storage unit as it is as the second cash storage unit. In this case, the cash apportioning mechanism becomes unnecessary.

According to the store sales proceed depositing machine of the present invention, by providing a cashing operation side equipped with the function of a cashing service at a side of the sales proceed depositing machine different from the deposit operation side, using part of the cash stored in the depositing section as cash for cashing use, enabling payout each time there is an instruction for cashing, and managing the sales proceed deposit data and the cashing data by different host computers, it becomes possible to manage deposits of sales proceeds and provide a customer cashing service by a single machine.

BRIEF DESCRIPTION OF THE DRAWINGS

The present invention will be more clearly understood from the description as set forth below with reference to the accompanying drawings, wherein:

FIG. 1 is a view of the appearance of a store sales proceed depositing machine of the related art and its connections with the outside;

FIG. 2A is a perspective view of a store sales proceed depositing machine of the present invention seen from the front;

FIG. 2B is a perspective view of a store sales proceed depositing machine of the present invention seen from the rear;

FIGS. 8A and 8B are flow charts of the cashing processing of the cashing section of the store sales proceed depositing machine of the present invention;

FIG. 9 is a view explaining ownership of cash inside the store sales proceed depositing machine of the present invention; and FIG. 10 is a system diagram explaining the connections of the store sales proceed depositing machine of the present invention with outside systems.

DESCRIPTION OF THE PREFERRED EMBODIMENTS

Figure 3:
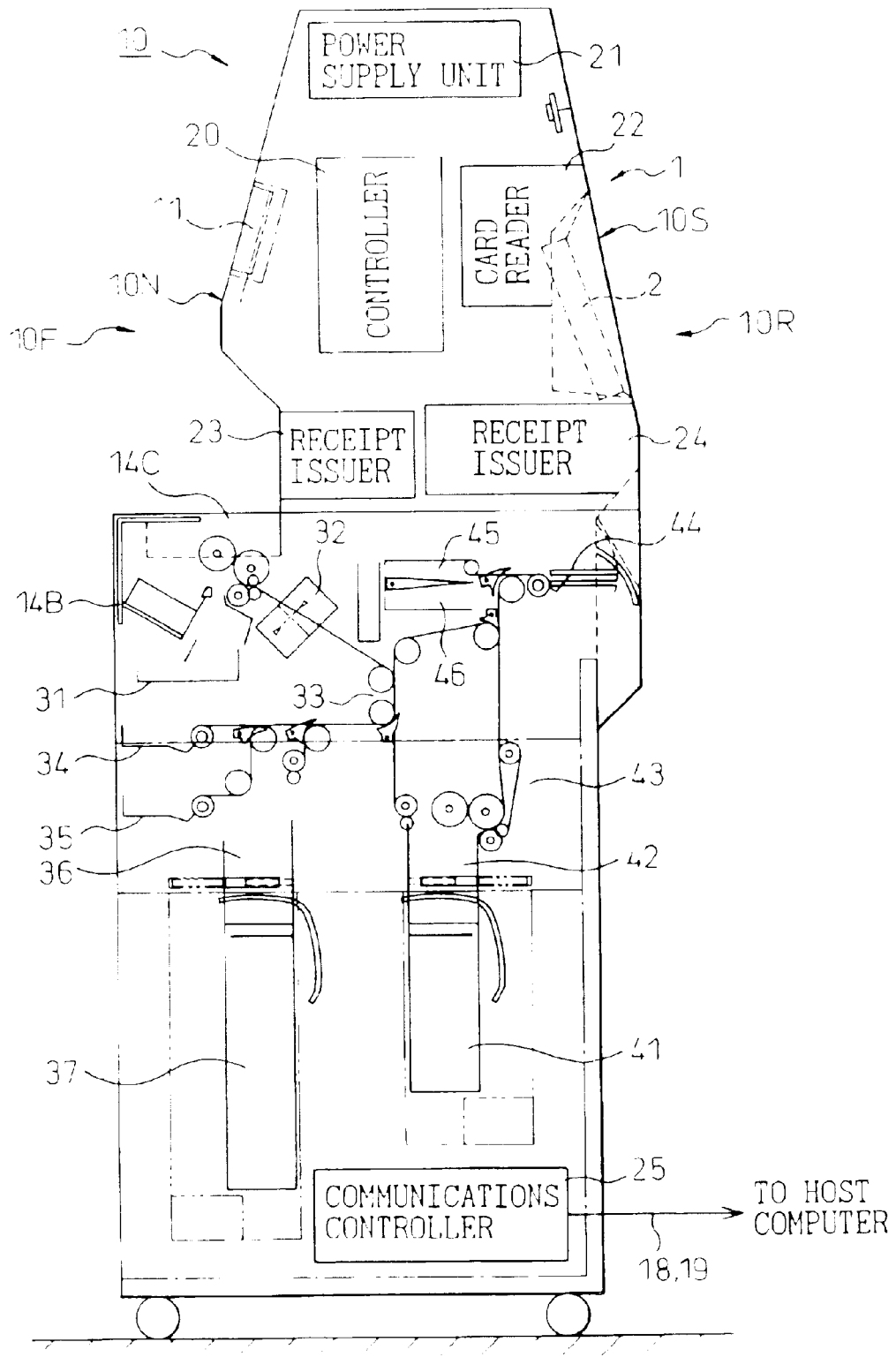
FIG. 3 is a view of the internal configuration of the store sales proceed depositing machine of the present invention.

Before describing the preferred embodiments, an explanation will be given of the store sales proceed depositing machine shown in FIG. 1.

FIG. 1 shows the appearance of a store sales proceed depositing machine 9 of the related art and its connections with outside machines. The front of the store sales proceed depositing machine 9 is provided with a deposit operation panel 11, a deposit operation card reader 12, a deposit receipt issuing slot 13, a bill insertion slot 14B, a coin insertion slot 14C, a bill rejection slot 15B, a coin rejection slot 15C, a bill return slot 16B, and a coin return slot 16C. The deposited bills or coins are stored in a cash storage unit inside the store sales proceed depositing machine 9. The store sales proceed depositing machine 9 is usually connected to a host computer (shown simply as "host" in the figure) in a management center of the cash logistics company through a public line 18. Further, the store sales proceed depositing machine 9 and the host computer 7 of the cash logistics company are connected to a host computer 8 of a financial institution such as a bank through dedicated lines or other communications lines 19.

When a certain sum of cash is accumulated at a store due to sales of products etc. or when the store is closing, the cash is deposited in the store sales proceed depositing machine 9 for safety purposes. The deposit operation is limited to the manager or employees of the store having deposit cards. The depositor inserts the deposit card into the a deposit card reader 12, then operates the deposit operation panel 11. Upon this, the bill insertion slot 14B and the coin insertion slot 14C open up. The depositor then inserts the bills into the bill insertion slot 14B and the coins into the coin insertion slot 14C. If there is no abnormality in the bills and the coins deposited, the deposited bills and coins are stored in the cash storage unit 17 in the machine. The cash storage unit 17 usually includes a bill cassette and a coin cassette and is designed to enable easy retrieval by an employee of the cash logistics company. If there is an abnormality in any of the bills or coins deposited, the store sales proceed depositing machine 9 does not accept that deposited bill or coin and returns it through bill rejection slot 15B or the coin rejection slot 15C. The bill return slot 16B and the coin return slot 16C are provided for returning the cash in the machine when the depositor decides to cancel the deposit for reasons of its own or when merely counting the deposit.

When the store deposits cash in the store sales proceed depositing machine 9, the deposit date and time, the store code, the deposited amount, the operation ID, and other information is sent as transmitted data through the public line 18 to the host computer 7 of the cash logistics company and is sent through the communications line 19 to the host computer 8 of the financial institution. The cash stored in the cash storage unit 17 of the store sales proceed depositing machine 9 belongs to the cash logistics company. The cash logistics company remits the equivalent of the amount of the cash deposited in the store sales proceed depositing machine 9 through a dedicated line 19 to the host computer 8 of the financial institution. The transmitted data at this time includes the deposit date and time, the store account number, the deposited amount, etc. The cash deposited and stored in the cash storage unit 17 of the store sales proceed depositing machine 9 is retrieved by the cash logistics company periodically and the amount remitted in advance by the cash logistics company then deposited in the cash logistics company.

As another embodiment, the host computer 8 of the financial institution may withdraw the deposited amount from the account of the cash logistics company based on the deposit data received from the store sales proceed depositing machine 9 through the communications line 19 and notify the cash logistics company of this through the communications line 19.

The cash logistics company generates revenue by the leasing charge of the store sales proceed depositing machine 9 to the store, handling fees at the time of deposit of the cash from the store in the store sales proceed depositing machine 9, cash retrieval fees from financial institutions, etc.

While such a system of installing a store sales proceed depositing machine in a store for safe retrieval of cash is high in security in handling of cash, the expenses of installation of the store sales proceed depositing machine and the cash retrieval service place a burden on the store and therefore increase store expenses. Therefore, many stores have been hesitant over installing such cash retrieval systems.

Further, when designed solely for depositing sales proceeds, there has been the problem of a low frequency of use of the store sales proceed depositing machine and only a minor contribution to the effective use of store space.

On the other hand, a hot topic now is the introduction of bank cashing services in convenience stores and other general retail outlets through the installation of cash dispensers. Even in such systems, however, the installation of cash dispensers requires a large expenditure on the part of the general retail outlets.

Further, seen from the cash logistics company side, it is necessary to go to the stores installing such store sales proceed depositing machines periodically to retrieve the cash and necessary to resupply cash whenever the cash for cashing in the cash dispensers installed in the retail outlets runs short. As a result, work is required for retrieving and resupplying cash from and to the machines of the system, so there is the problem of an increased number of employees and consequently higher costs.

FIGS. 2A and 2B show the configuration of an example of a store sales proceed depositing machine 10 of the present invention. FIG. 2A shows the store sales proceed depositing machine 10 seen from the front side 10F, while FIG. 2B shows the store sales proceed depositing machine 10 of FIG. 1A seen from the rear side 10R. The store sales proceed depositing machine 10 of this embodiment has a depositing section 10N similar to that of the related art at its front side 10F. and a cashing section 10S at its rear side 10R. Members the same as the machine of FIG. 1 are assigned the same reference numerals.

The functions of the depositing section 10N are the same as the store sales proceed depositing machine 9 of the related art. The front side 10F. is provided with a deposit operation panel 11, a deposit operation card reader 12, a deposit receipt issuing slot 13, a bill insertion slot 14B, a coin insertion slot 14C, a bill rejection slot 15B, a coin rejection slot 15C, a bill return slot 16B, and a coin return slot 16C. The deposited bills or coins are stored in a cash storage unit 17 inside the store sales proceed depositing machine 10. The store sales proceed depositing machine 10 of this embodiment is also connected to a host computer in a management center of the cash logistics company through a public line 18. Further, the store sales proceed depositing machine 10 and the host computer of the cash logistics company are connected to a host computer of a financial institution such as a bank through dedicated lines or other communications lines.

On the other hand, the cashing section 10S at the rear side 10R of the store sales proceed depositing machine 10 is provided with a cashing operation panel 1, a cashing operation screen 2, a cashing card insertion slot 3, a cashing receipt issuing slot 4, and a cash dispensing slot 5. The machine has a cashing use cash storage unit 6 inside it. The cashing section 10S of this embodiment is configured to enable dispensing of only bills.

When cashing, the person withdrawing the cash inserts his or her bank card or credit card or other ID card into the cashing card insertion slot 3. The cashing section 10S verifies the identity of the customer by verification of the PIN based on data recorded on the ID card, verifies the balance of savings in the financial institution, and then displays whether it authorizes cashing. When authorizing cashing, the person withdrawing the cash inputs the cashing amount on the cashing operation screen 2. The cashing section 10S withdraws the designated cash from the cashing use cash storage unit 6, dispenses the cash at the cash dispensing slot 5, and issues a receipt showing the remaining balance from the cashing receipt issuing slot 4.

FIG. 3 shows an embodiment of the internal configuration of the store sales proceed depositing machine 10 shown in FIGS. 2A and 2B. At the upper part of the machine where the deposit operation panel 11 of the depositing section 10N and the cashing operation screen 2 of the cashing section 10S are provided, a controller 20, power supply unit 21, card reader 22, receipt issuer 23 of the depositing section 10N, and receipt issuer 24 of the cashing section 10S are provided. Further, at the bottom part of the machine near the bill insertion slot 14B and the coin insertion slot 14C, a foreign object receptacle 31, a deposit discriminator 32, a cash apportioner 33, a cash rejection receptacle 34, a bill counter 35, and a deposit temporary holder 36 are provided. Below the deposit temporary holder 36 is provided a cassette type first cash storage unit 37. The first cash storage unit 37 includes a not shown bill cassette and a coin cassette.

Further, at the bottom part of the machine, a second cash storage unit 41 is provided at a location adjoining the first cash storage unit 37. In this embodiment, the second cash storage unit 41 is provided with only a cassette for bills. Above the second cash storage unit 41 is provided a cashing temporary holder 42 for temporarily holding cash withdrawn from there. Above this is provided a cashing counter 43 and a bill dispenser 44. Further, at a position adjoining the bill dispenser 44 are provided a forgotten cash holder 45 for temporarily storing cash forgotten to be taken and a cashing rejection unit 46 for rejecting abnormal bills without dispensing them.

Further, at the bottommost part of the machine, a communications controller 25 for connecting with a public line 18 and communications line 19 is provided. This communicates with the host computer of an outside cash logistics company through the public line 18 to notify it of the depositing data when cash is deposited in the depositing section 10N, cashing data when cash is dispensed from the cashing section, etc. Further, it can communicate with the host computer of a financial institution etc. through the communications line 19.

Figure 4:
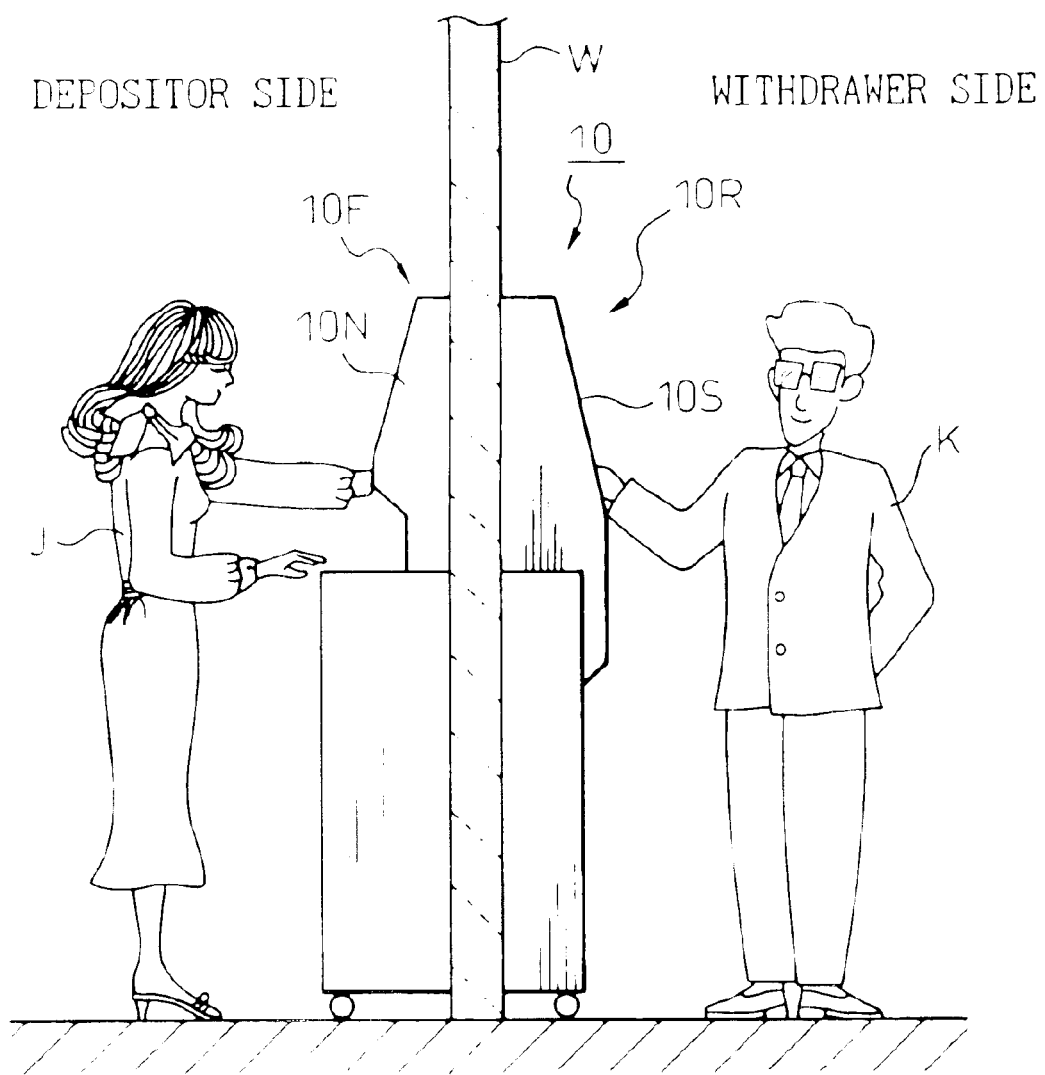
FIG. 4 is a view of an example of the state of installation of a store sales proceed depositing machine of the present invention in a store.

FIG. 4 is a view of an example of the state of installation of a store sales proceed depositing machine 10 of the above embodiment in a store. When installing a store sales proceed depositing machine 10 in a store, for example, the depositing section 10N and the cashing section 10S are separated by a wall W. The depositing section 10N is therefore made to be accessible by only the manager or employees J of the store, while the cashing section 10S is made usable by the general public K including store customers. By doing this, the store customers and rest of the general public K do not know there is a depositing section 10N at the rear side of the cashing section 10S, mistaken deposits at the depositing section 10N are prevented, and there is no fear of cash being stolen when the manager or employees J are operating the depositing section.

Figure 5:
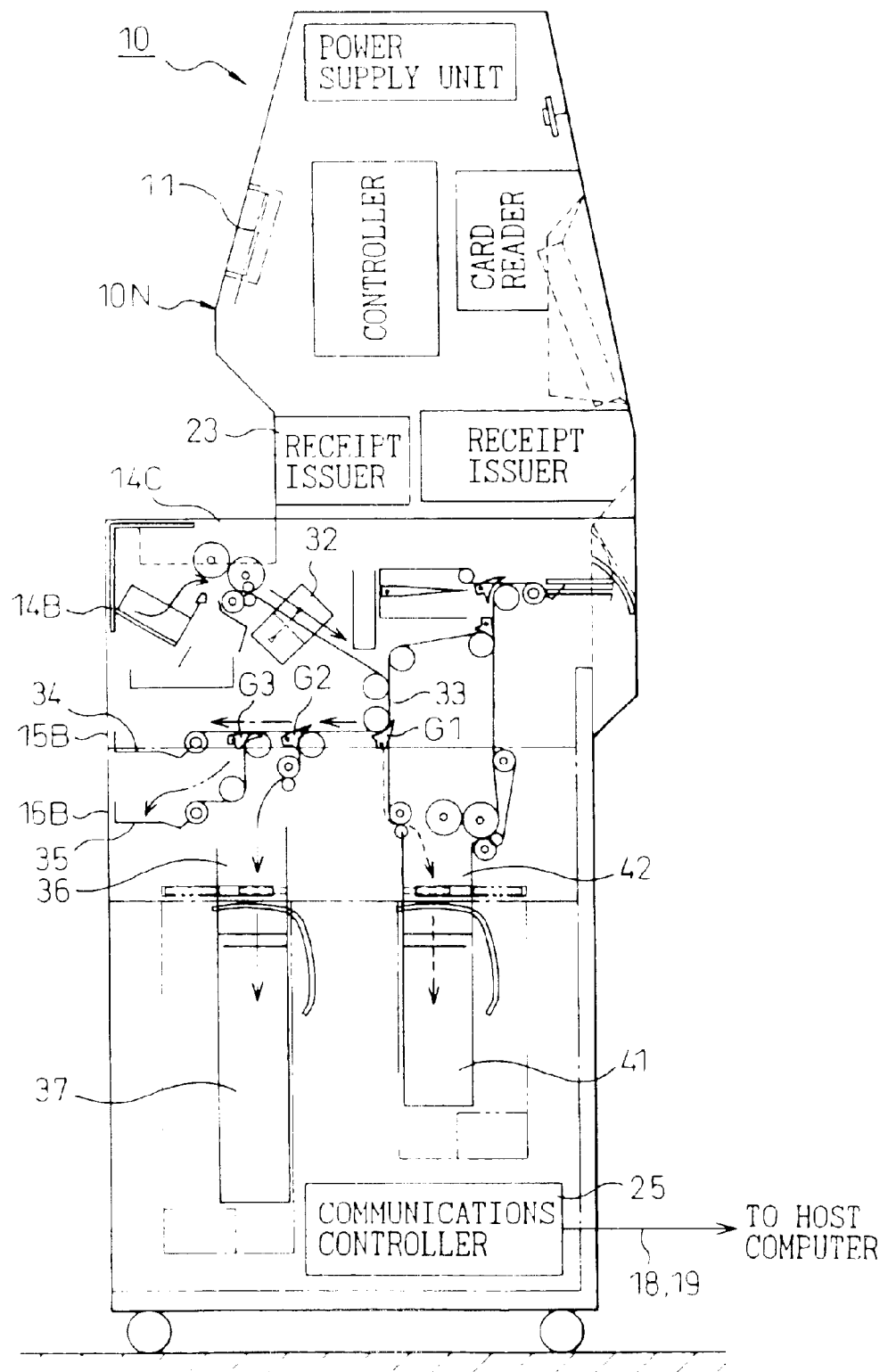
FIG. 5 is a view explaining the flow when depositing cash in the store sales proceed depositing machine of FIG. 3.

FIG. 5 explains the flow at the time of depositing cash in the depositing section 10N of the store sales proceed depositing machine 10. When depositing cash, the bills or coins are deposited from the bill insertion slot 14B or the coin insertion slot 14C. Note that in the store sales proceed depositing machine 10 of the present invention, only bills deposited in the depositing section 10N are transferred to the cashing section 10S. The coins are merely stored at the depositing section 10S side and are not dispensed from the cashing section 10S. Therefore, coins are stored in the depositing section 10N in exactly the same way as the depositing machines of the related art. Accordingly, here, the explanation of the route of conveyance of the coins in the depositing section is omitted and only the flow of bills in the store sales proceed depositing machine 10 will be explained.

First, an explanation will be given of the flow of bills when deposited bills are stored in the first cash storage unit 37. The bills deposited in the depositing section 10N from the bill insertion slot 14B are fed inside one at a time. The deposit discriminator 32 determines the amount of the bills and whether the bills are normal or abnormal. If normal bills, the bills pass through a gate G1 and gate G2 of the cash apportioner 33 and are stacked in the deposit temporary holder 36. The bills stacked in the deposit temporary holder 36 still belong to the depositor, that is, the store.

In this state, the amount of the deposit is displayed on the deposit operation panel 11. The depositor confirms the deposited amount and performs confirmation processing. The bills stacked in the deposit temporary holder 36 are then stored in the first cash storage unit 37. This flow is shown by the solid line arrows. When the bills are stored in the first cash storage unit 37, the ownership of the bills passes from the depositor (store) to the cash logistics company and a receipt is issued from the receipt issuer 23. When the bills are stored in the first cash storage unit 37, the depositing section 10N sets the deposited amount as deposit data and sends the data to the host computers of the financial institution and cash logistics company through the communications controller 25.

On the other hand, when the deposit discriminator 32 determines that a bill is abnormal, the bill is passed through the gate G1 and gate G2 of the cash apportioner 33, then passes through the gate G3 and is stored in the cash rejection receptacle 34 as shown by the one-dot chain line. The abnormal bill is then conveyed to the deposited bill rejection slot 15B and returned to the depositor. Therefore, this bill is not deposited at the cash logistics company.

Further, when selecting to only count the amount of bills by inputting this at the deposit operation panel 11, the normal bills counted by the deposit discriminator 32 are passed through the gate G1 and gate G2 of the cash apportioner 33, then stored from the gate G3 in the bill counter 35 as shown by the two-dot chain line. The bills stored in the bill counter 35 are discharged from the deposit bill return slot 16B and returned to the depositor.

Finally, an explanation will be given of the flow of the bills when deposited bills are stored in the second cash storage unit 41. The bills deposited from the deposit bill insertion slot 14B into the depositing section 10N are fed inside one at a time and judged as to the amount of the bills and whether the bills are normal or abnormal by the deposit discriminator 32.

When the deposited bills are stored in the second cash storage unit 41 in their entirety, they are determined as normal bills, then passed from the gate G1 of the cash apportioner 33 through the route shown by the broken line and are stacked in the cashing temporary holder 42. The bills stacked in the cashing temporary holder 42 still belong to the depositor, that is, the store.

In this state, the deposited amount is displayed on the deposit operation panel 11. The depositor confirms the deposited amount and performs confirmation processing. The bills stacked in the deposit temporary holder 42 are then stored in the second cash storage unit 41. When the bills are stored in the second cash storage unit 41, the ownership of the bills is transferred from the depositor (store) to the cash logistics company.

When part of the deposited bills is stored in the second cash storage unit 41, they are judged as normal bills, then only the amount of the bills stored in the second cash storage unit 41 is passed from the gate G1 of the cash apportioner 33 through the route shown by the broken line and is stacked in the cashing temporary holder 42. The remaining normal bills are passed through the gate G1 and gate G2 of the cash apportioner 33 and stacked in the deposit temporary holder 36. The bills stacked in the deposit temporary holder 36 and the cashing temporary holder 42 still belong to the depositor that is, the store, as mentioned above.

In this state, the total deposited amount of the bills stacked in the deposit temporary holder 36 and the cashing temporary holder 42 is displayed on the deposit operation panel 11. The depositor confirms the deposited amount and performs confirmation processing. The bills stacked in the deposit temporary holder 36 are then stored in the first cash storage unit 37, while the bills stacked in the cashing temporary holder 42 are then stored in the second cash storage unit 41. When the bills are stored in the first cash storage unit 37 and the second cash storage unit 41, the ownership of the bills is transferred from the depositor (store) to the cash logistics company.

When all or part of the deposited bills is stored in the second cash storage unit 41, the depositing section 10N sets the amounts deposited in the first cash storage unit 37 and the second cash storage unit 41 as the deposit data and sends the data to the host computers of the financial institution and cash logistics company through the communications controller 25. Part or all of the deposited bills is stored in the second cash storage unit 41 when the balance of the cash of the second cash storage unit 41 has not reached a prescribed amount. This prescribed amount is at least the limit of maximum payment of the cashing section 10S. When the balance of cash in the second cash storage unit 41 reaches the prescribed amount, the deposited bills are not stored in the second cash storage unit 41.

Figure 6:
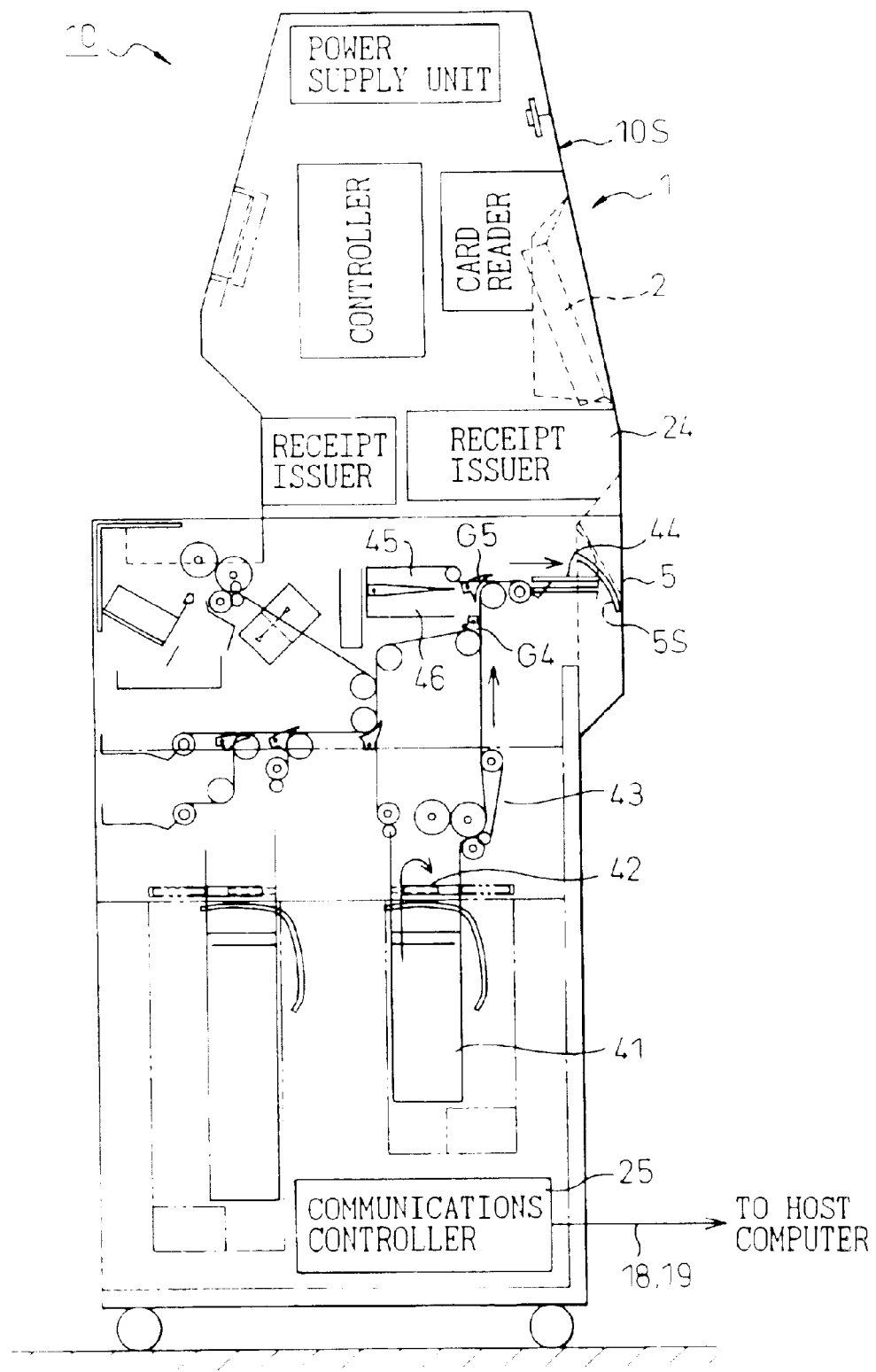
FIG. 6 is a view explaining the flow when dispensing cash from the store sales proceed depositing machine of FIG. 3.

FIG. 6 explains the flow when dispensing cash from the cashing section 10S in the store sales proceed depositing machine 10 of FIG. 3.

The person withdrawing the cash operates the cashing operation panel 1 and inserts his or her ID card. The cashing section 10S side then verifies the identity of the person withdrawing the cash and verifies his or her bank balance. When determining that cash may be dispensed, the bills corresponding to the amount input by the person withdrawing cash on the cashing operation screen 2 are taken out from the second cash storage unit 41 and held once in the cashing temporary holder 42. The bills in the cashing temporary holder are fed out one at a time and checked by the cashing counter 43 for normality and amount.

When the bills are confirmed to be normal, the bills pass through the gate G4 and the gate G5 and the number for cashing is stacked in the bill dispenser 44. The cash for cashing becomes owned by the lease company at this time and is discharged from the cashing use cash discharge slot 5 in place of the amount withdrawn from the savings account of the customer. The discharge operation ends when the shutter 5S of the cashing use cash discharge slot 5 opens and the person withdrawing cash takes the bills out from there. A receipt is issued by the receipt issuer 24. At that time, the cashing section 10S uses the communications controller 25 to notify the host computer of the cash logistics company of the completion of the cashing operation and the amount cashed through the public line 18 and notifies the host computer of the financial institution of the same data through the communications line 19.

On the other hand, when the cashing counter 43 confirms that a bill is not normal, the bill is transferred through the gate G to the cashing rejection unit 46 together with the amount already stacked in the bill dispenser 44. In this case, processing is performed to count the number of bills for payout from the start once again.

Further, when the person withdrawing the cash forgets to take the cash despite the shutter 5S of the cashing use cash discharge slot 5 being opened and the cash being available for being picked up, the shutter 5S is closed and the forgotten cash left in the cashing use cash discharge slot 5 is stored in the forgotten cash holder 45 through the gate G5.

In this way, in the store sales proceed depositing machine 10 of the present invention, since the route for conveyance of cash deposited in the depositing section 10N and the route for conveyance of cash dispensed from the cashing section 10S are configured separately, even if trouble such as jamming occurs in the route of conveyance of the bill at the time of deposit or cashing, the ownership of the cash can be identified.

Here, an explanation will be made of the deposit processing of the depositing section 10N and the cashing processing of the cashing section 10S in the store sales proceed depositing machine 10 through which bills are conveyed as explained above while referring to FIGS. 7A, 7B, 8A, and 8B.

Figure 7A:
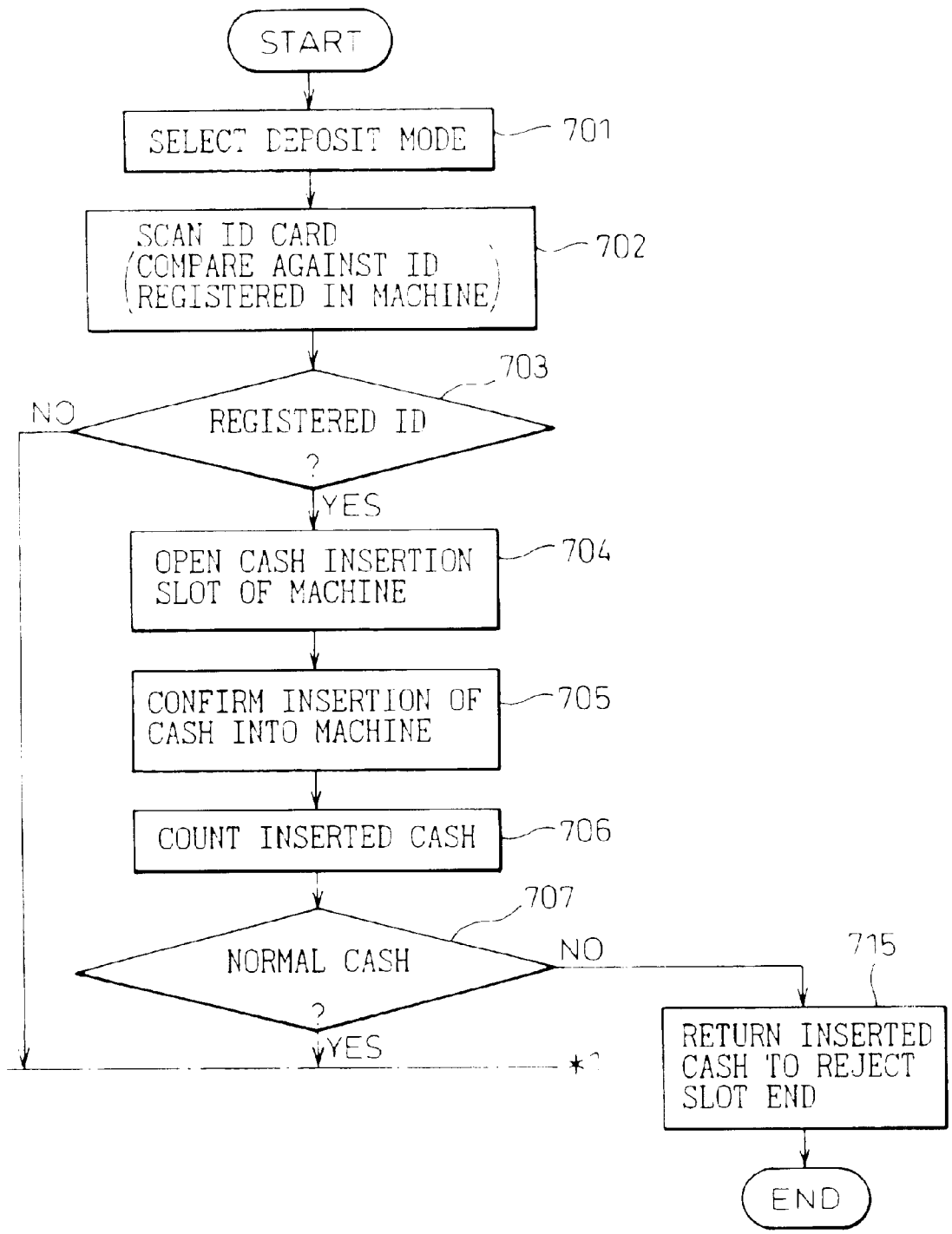
FIGS. 7A and 7B are flow charts of the deposit processing of the depositing section of the store sales proceed depositing machine of the present invention.
Figure 7B:
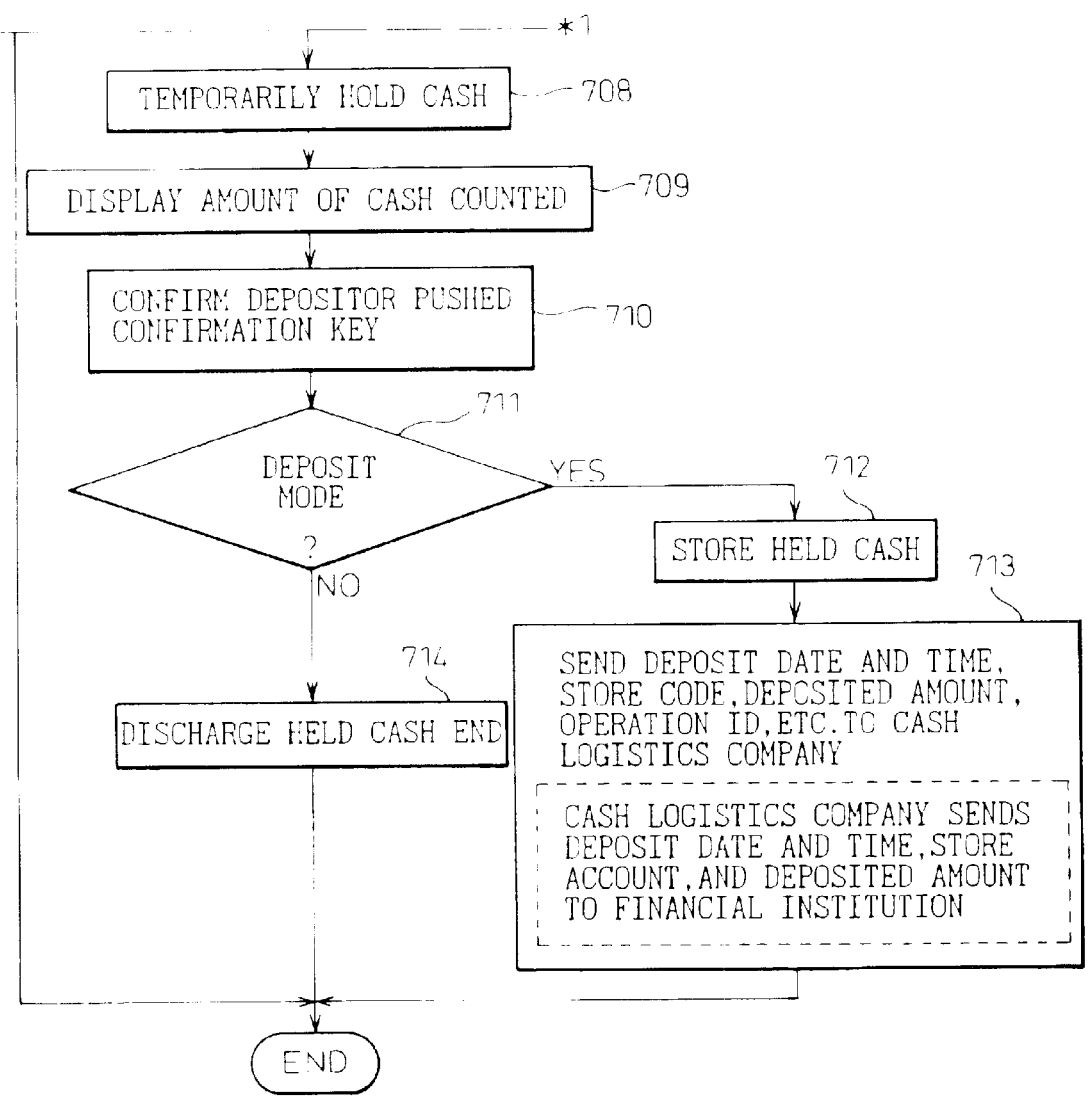

FIGS. 7A and 7B explain the deposit processing in the depositing section 10N of the store sales proceed depositing machine 10. At the time of deposit, first, at step 701 the depositor is made to select a deposit mode. The depositor is made to select th deposit mode to choose between actual deposit and counting of the deposited amount. After selecting the deposit mode, the depositor inserts his or her deposit card (ID) card in the depositing section. At step 702, the ID card is scanned. In this operation, the ID of the ID card of the depositor and the registered ID stored in the depositing section 10N are compared for verification.

Next, at step 703, it is determined whether the ID of the ID card is the registered ID. If not the registered ID, the deposit processing is not authorized and the routine is ended. If the registered ID, the control proceeds to step 704. At step 704, the cash insertion slot of the depositing section is opened. At the next step 705, the insertion of cash into the depositing section is confirmed. Next, the cash inserted at step 706 is counted and it is determined whether the cash inserted at step 707 is normal or not.

If the inserted cash is not normal, the control proceeds to step 715, where the inserted cash is returned to the rejection slot and the routine is ended. On the other hand, when the inserted cash is normal, the cash counted at step 708 is held in the cash temporary storage unit. At the next step 709, the counted cash is displayed on the deposit operation panel of the depositing section and the depositor is made to confirm if the counted amount matches the deposited amount.

At step 710, it is confirmed if the depositor has pressed the confirm key of the deposit operation panel. If he or she has, it is determined that the deposit mode selected at step 701 is the deposit mode. If not the deposit mode, it is the cash counting mode, so the control proceeds to step 714, where the cash held in the cash temporary storage unit is discharged from the deposit bill return slot or the deposit coin return slot and the routine ended.

On the other hand, when the mode is judged to be the deposit mode at step 711, the control proceeds to step 712, where the cash held in the cash temporary holder is stored in the cash storage unit. In actuality, the cash temporary holder is the deposit temporary holder or cashing temporary holder as explained in FIG. 5. The deposited bills are apportioned between the deposit temporary holder and the cashing temporary holder in accordance with the balance of the bills in the second cash storage unit and thereby stored apportioned between the first and second cash storage units, but no explanation will be given of the details of this here.

If cash held at step 712 is stored in the cash storage unit, at step 713, the depositing section sends the deposit date and time, store code, deposited amount, operation ID, and other data to the cash logistics company and the financial institution through the public line and communications line and the routine is ended. Here, the example is shown of the case where when data is sent from the depositing section to the cash logistics company, the cash logistics company sends data on the deposit date and time, the store account, and the deposited amount to the financial institution. In storing cash held at step 712, when the deposited bills are apportioned to the second cash storage unit, the data transmitted from the depositing section to the cash logistics company at step 713 includes this apportioning data as well.

Further, as another example, at step 713, at the time of deposit, the financial institution collects the deposited amount from the account of the cash logistics company based on the deposit data input through the communications line and notifies this to the cash logistics company.

FIGS. 8A and 8B explain the cashing routine using the cashing section 10S of the store sales proceed depositing machine 10. At the time of cashing, the person withdrawing the cash inserts his or her bank cashing card or credit card or other ID card in the cashing section. The cashing section scans the ID card at step 801 and reads the data such as the account number in the financial institution, the PIN, etc. At the next step 802, the section receives the PIN of the ID card and compares it against the PIN read at step 801. When the PINs match, at the next step 803, the input of the cashing amount is accepted. When the PINs do not match, the input of the cashing amount is not accepted. Here, however, the explanation of the processing when the PINs do not match will be omitted.

When the PINs match and the cashing amount is input, at step 804, the cashing section communicates with the host computer of the financial institution through the host computer of the cash logistics company, determines if the cashing amount is present in the savings account of the person withdrawing the cash, and notifies the cashing section of whether or not it authorizes cashing. The authorization for cashing may also be made directly to the financial institution using the communications line. The cashing section determines whether cashing has been authorized at step 805 and when cashing is not authorized, ends the routine there as it is. On the other hand, when cashing is authorized, the control proceeds to step 806, where the bills are taken out from the second cash storage unit, the cashing use cash is counted, and it is determined if the cashing use bills are normal or not.

When a bill taken out from the second cash storage unit is not normal, the control proceeds to step 808, where the already counted bills are retrieved at the cashing rejection unit. The control returns to step 806, where bills are again taken out from the second cash storage unit, the cashing use cash is counted, and it is determined if the cashing use bill are normal or not. If the cashing use bill are all normal, the counted currency is held in the cash temporary holder at step 809. Next, at step 810, the shutter of the bill dispenser of the cashing section is opened and the bills held in the cash temporary holder are made available from he bill dispenser.

When all of the bills have been taken out after the shutter is opened, the control proceeds to step 812, where the cashing section transmits the cashing date and time, the store code, the cashed amount, the operation ID, and other data through the public line to the cash logistics company and the routine is ended. Here, the example is shown of the case where when data is sent from the cashing section to the cash logistics company, the cash logistics company then transmits the cashing date and time, the store account, and the cashed amount to the financial institution. Further, when the bills are not taken out from the bill dispenser even after the elapse of a predetermined time regardless of the fact that the shutter is opened, the control proceeds to step 813, where the cash in the bill dispenser is taken into the cashing section, the cash forgotten to be taken is transferred to the forgotten cash holder, and the routine is ended. As another example, at step 812, the cashing data is sent first to the financial institution through the communications line and the cashing data is sent from the financial institution to the cash logistics company.

Here, the stages of ownership of the cash inside the store sales proceed depositing machine 10 explained above will be clarified using FIG. 9.

The bills B and the coins C of the sales proceeds of the store are owned by the store while outside the depositing section 10N. Even when the bills B enter the depositing section 10N from the deposit bill insertion slot 14B and the coins C enter the depositing section 10N from the deposit coin insertion slot 14C, the bills B and the coins C still belong to the store while the bills B and the coins C are in the deposit temporary holder 36. This is because the bills B and the coins C held in the deposit temporary holder 36 may be returned from the depositing section 10N.

On the other hand, the coins C held in the deposit temporary holder 36 become owned by the cash logistics company when the coins C enter the coin cassette 37C forming part of the first cash storage unit. Further, the bills B held in the deposit temporary holder 36 become owned by the cash logistics company when the bills B enter the bill cassette 37B forming part of the first cash storage unit or when they enter the cashing use bill stacker 41 forming part of the second cash storage unit.

Next, at the cashing section 10S side, the ownership of the bills is transferred from the cash logistics company to the lease company when the bills are taken out from the cashing use bill stacker 41 and reach the bill dispenser (shown as the bill pool in the figure) 44. Further, the bills B become owned by the person withdrawing the bills (customer) when the bills B are taken outside of the cashing section 10S from the bill pool 44.

Note that when a bill taken out from the cashing use bill stacker 41 is judged to be not normal and enters the cashing rejection unit 46, the rejected bill still belongs to the cash logistics company. Further, the bills B from the bill pool 44 taken outside the cashing section 10S, but forgotten by the withdrawing customer and held in the forgotten cash holder 45 in the cashing section 10S belong to the withdrawing customer.

The bills reaching the bill pool 44 become owned once by the lease company since the bills are used for paying out the equivalent of the amount withdrawn from the savings account of the customer receiving the cash and under the law usually the lease company is paying out the cash.

Next, an explanation will be given of an example of the configuration of an actual system using the store sales proceed depositing machine 10 of the present invention with reference to FIG. 10. The store sales proceed depositing machine 10 of the present invention is installed in a store 30 in a wall W. The depositing section 10N is designed to be used by employees J of the store for depositing cash, while the cashing section 10S is designed to be used by customers K of the store. The store sales proceed depositing machine 10 connects to the management center 50 of the cash logistics company 40 through the public line 18. Further, the store sales proceed depositing machine 10 sends the data of deposits into the depositing section 10N from employees J through the public line 18 to the deposit use host computer 51 of the management center 50 and sends the data on cash dispensed from the cashing section 10S through the same public line 18 to the cashing use host computer 52 of the management center 50 individually. The host computer 52 includes a cashing use server 53 and a financial institution transmission server 54 connected to the cashing use server 53. The financial institution transmission server 54 connects through the communications line 19 to the host computer 61 of the financial institution in which the person withdrawing the cash has a savings account, that is, the bank 60.

Further, it is possible to connect the store sales proceed depositing machine 10 through the communications line 19 directly to the host computer 61 of a financial institution, that is, a bank 60.

At this time, the deposit data is processed by the deposit use host computer 51 of the management center 50. Further, the cashing data is processed by the cashing use host computer 52 of the management center 50 and host computer 61 of the bank 60 and host computer 71 of a credit company or life insurance company etc. 70 connected to it through the communications line 19. This is because the deposit processing host computer 51 is for processing the data on deposits of sales proceeds of the machine installed in the store, and the post processing such as the work of rechecking sales proceeds after receipt of data from the depositing section 10N and the counting after recheck and transmission of the count data to the bank can be performed at just the host computer 51 of the management center 50.

On the other hand, the cashing service requires verification of the balance in the account of the customer at the bank 60 or authorization for cashing from a credit company etc. 70 and requires a data antitampering and theft means in the host computer 52 of the management center to maintain confidentiality of customer information. That is, the cashing processing requires the same processing time and capability of frequency of use as current cash dispensers of financial institutions. Therefore, the cashing service is managed not by processing of data in the host computer for deposit processing in the management center 50, but by providing a separate special host computer 52 for cashing processing in the management center 50 and sending the data 71 to the host computer 61 of the bank 60 and host computer of a credit company etc. 70 through the special host computer 52 for cashing processing. In this way, to enable the cash logistics company 50 to provide the cashing service, a special host computer 52 for cashing processing separate from the host computer 51 for deposit processing is provided in the management center 50 of the cash logistics company 40.

Further, it is possible to provide a subsystem 55 in the management center 50 and input the results of processing of the host computer 51 processing the deposit data and the host computer 52 of the managing the cashing service into the subsystem 55 to feed back the results of completion of cashing to the deposit data. Further, by feeding back the cashing data into the deposit data, it becomes possible to ensure a match between the amounts of the cash remaining in the store sales proceed depositing machine 10 and the cash to be retrieved by the cash logistics company 40 from the store sales proceed depositing machine 10.

Further, the management center 50 can connect with a security company 56 or maintenance company through the public line 18. Note that as mentioned above, data on deposits and cashing can be sent from the store sales proceed depositing machine 10 through the communications line 19 to the host computer 61 of the bank 60 directly and that data sent from the bank 60 side to the cash logistics company 40.

In the system configured as explained above, the following are possible:

(1) By diverting part of the sales proceeds of the store 30 for use for cashing inside the store sales proceed depositing machine 10 and thereby reducing the frequency of retrieval of cash by the cash logistics company 40 and by using the store sales proceed depositing machine 10 for a cashing service, the profit obtained from the cashing service can be returned to the store 30 side and therefore the cost of installation and use of the store sales proceed depositing machine 10 at the store 30 side can be reduced.

(2) The sales proceeds of the store 30 are stored inside the store sales proceed depositing machine 10 until being retrieved by the cash logistics company 40, so it becomes necessary to reconcile the interest lost with the data of the immediate remittance, but the interest burden can be reduced by making effective use of the sales proceeds for the cashing.

(3) Since sales proceeds of the store 30 can be retrieved and cash for cashing can be resupplied in the same store sales proceed depositing machine 10, the work of the cash logistics company 40 can be reduced from the former trip for retrieval of cash and trip for resupply of cash to a single trip and therefore the logistics cost can be reduced.

(4) With just deposit of sales proceeds, use of the store sales proceed depositing machine 10 by just the store manager results in poor efficiency of utilization, but by enabling use of the other side of the store sales proceed depositing machine 10 as a cashing section, customers visiting the store 30 can be provided with additional service, the space where the machine is installed in the store can be used for providing additional service to the customers, and therefore use for providing additional service becomes possible.

Note that in the above embodiments, the explanation was given of a store sales proceed depositing machine with a cashing section provided at the rear side of a depositing section, but the cashing section does not have to be at the rear side of the store sales proceed depositing machine. The side where it is provided is not particularly limited so long as it is not the same side as the depositing section.

As explained above, according to the store sales proceed depositing machine of the present invention, by providing a cashing operation side having a cashing service function at a side opposite to the deposit operation side of the machine, using part of the cash stored in the depositing section for cashing, and enabling payout with each cashing instruction and by managing the deposit data and cashing data by different host computers, there is the effect that a single machine can manage deposits of sales proceeds and provide a customer cashing service. As a result, the frequency of retrieval and resupply of cash by the cash logistics company can be reduced and the cost of installation of a sales proceed deposit machine at the store side can be lowered by use of the deposit machine as a cashing machine.

What is claimed is:

1. A store sales proceed depositing machine having a deposit operation panel located at one side of the machine and, inside the machine, a cash storage unit and an external communications unit to notify cash logistics company of deposit data through a public line, the machine comprising:

a cashing operation panel located at another side of the machine different from the side at which the deposit operation panel is located;

a cashing controller, a second cash storage unit storing a predetermined amount of cash for a cashing service, a cash temporary holder removing and temporarily holding a cashed amount from the second cash storage unit, and a cashing processor dispensing cash from the cash temporary holder and issuing a receipt, the cashing controller, the second cash storage unit, the cash temporary holder, and the cashing processor being located inside the machine; and a cash apportioner located before the cash storage unit to apportion deposited cash between the cash storage unit and the second cash storage unit, a part of the deposited cash being used to resupply the cash in the second cash storage unit, wherein the external communications unit communicates with a financial institution, wherein the cashing controller performs processing to verify a person performing the cashing operation, determine whether to authorize cashing by confirming a balance in a savings account of the person, dispense cash to be reimbursed from the savings account when authorizing cashing, and provide cashing data to the financial institution and to he cash logistics company, and wherein the cash apportioner changes a ratio of apportionment of the deposited cash with a balance of cash for the cashing service in the second cash storage unit being the predetermined amount.

2. A store sales proceed depositing machine as set forth in claim 1, wherein the external communications unit notifies the cash logistics company of the deposit data and an amount of cash apportioned by the cash apportioner to the second cash storage unit for use by the cash logistics company to maintain consistency between an amount of sales proceeds deposited and an amount of cash retrieved by the cash logistics company.

* * * * *

UNITED STATES PATENT AND TRADEMARK OFFICE
CERTIFICATE OF CORRECTION

PATENT NO. : 6,848,612 B2
DATED : February 1, 2005
INVENTOR(S) : Tsutomu Uematsu et al.

It is certified that error appears in the above-identified patent and that said Letters Patent is hereby corrected as shown below:

Title page,
Item [73], Assignee, change "Fujitsu Limited, Kawasaki (JP)" to -- Fujitsu Limited, Kawasaki (JP) and Nippon Express Co., Tokyo (JP) --.
Item [57], ABSTRACT,
Line 10, change "temporary" to -- temporarily --.

Column 13,
Line 12, after "notify" insert -- a --.

Column 14,
Line 12, change "he" to -- the --.

Signed and Sealed this

Twenty-first Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,848,612 B2
DATED : February 1, 2005
INVENTOR(S) : Tsutomu Uematsu et al.

It is certified that error appears in the above-identified patent and that said Letters Patent is hereby corrected as shown below:

<u>Title page,</u>
Item [75], Inventors, change "Kauzhi Watari" to -- Kazushi Watari --.

Signed and Sealed this

Thirteenth Day of June, 2006

JON W. DUDAS
*Director of the United States Patent and Trademark Office*